Patented Aug. 14, 1951

2,563,804

UNITED STATES PATENT OFFICE 2,563,804

RESOLUTION OF PARA-NITROBENZOYL-L-THREONINE

Arthur J. Zambito, Rahway, and Eugene E. Howe, Bound Brook, N. J., assignors to Merck & Co., Inc., Rahway, N. J., a corporation of New Jersey No Drawing. Application January 5, 1949, Serial No. 69,402

2 Claims. (Cl. 260—236)

This invention relates to a new and improved method for the resolution of racemic DL-threonine into its optically active stereoisomers, D-threonine and L-threonine, and to new compounds obtained in such resolution.

DL-threonine is one of the essential amino acids, i. e. cannot be synthesized, at least in adequate quantities, by the animal itself and must be obtained from external sources, its absence being responsible for failure of growth in animals and possibly other more serious consequences.

A method for the resolution of this amino acid into its isomers described by West and Carter (J. Biol. Chem. 119, 109, 1937) involves the preparation of N-formyl-O-methyl-DL-threonine, reacting this derivative with brucine to give the brucine salts of N-formyl-O-methyl-D-threonine and N-formyl-O-methyl-L-threonine, removing the brucine with sodium hydroxide and the splitting off the formyl and methyl group with hydrobromic acid to give the desired L- and D-isomers.

In this and in other methods for the resolution of amino acids, the D-isomer is first isolated while the L-isomer is indirectly recovered from the residue. The use of methods embodying a procedure such as this is undesirable in that, while the L-isomer is identical with natural threonine and physiologically more important than the D-isomer, it can be separated and isolated from its isomer only by a series of long and complicated steps. Another objection to the method described supra is that the starting material in the resolution is not a racemic mixture of DL-threonine but is unduly involved by the necessity for utilizing a threonine intermediate, N-formyl-O-methyl-DL-threonine, which must be synthesized. A further objection is that this involved extraction process makes it difficult to isolate L-threonine in high yield and in good purity. Likewise, the usual methods of resolution of amino acids are further complicated by the use and need for combinations of various solvents and resolving agents.

In marked contrast to other methods of resolution, it has now been discovered that L-threonine can be separated and isolated directly from its isomer, D-threonine, by a new and comparatively simple method wherein surprisingly, the D-isomer is unstable and remains in solution. Experimental study has shown that the brucine salt of the D-isomer exists in two states characterized as: (1) a soluble, low melting deep orange form which gradually changes to (2) an insoluble, high melting and light yellow product. As the brucine salt of p-nitrobenzoyl-L-threonine is insoluble in methanol, it must be separated from the methanol soluble orange form of the D salt before the latter changes into its insoluble form. Essentially, the resolution of DL-threonine is effectively accomplished by taking advantage of the difference in solubilities of the brucine salts of the optical isomers of p-nitrobenzoyl-threonine and this compound is accordingly prepared and the resolution thereof is effected.

By using this direct method, the isomer is obtained in substantially pure form and in high yield. Conveniently, only one solvent and resolving agent are required.

Considered in its broadest phases, this method comprises reacting a racemic mixture of DL-threonine with p-nitrobenzoylchloride, treating the product, p-nitrobenzoyl DL-threonine with brucine to form the brucine salts of this compound, separating the L- and D-brucine salts followed by removal of the brucine with sodium hydroxide and then the p-nitrobenzoyl group by refluxing with hydrobromic acid to obtain substantially pure L- and D-threonine.

The brucine salts of the optical isomers of p-nitrobenzoyl-threonine may be obtained by reacting p-nitrobenzoylchloride with DL-threonine in alkaline solution, removing whatever p-nitrobenzoic acid may be formed and then reacting the p-nitrobenzoyl DL-threonine with brucine in methanol. An exceptionally precise separation is obtained between the brucine salts of p-nitrobenzoyl DL-threonine due to the difference in their solubilities in this medium.

The brucine salt of p-nitrobenzoyl-L-threonine is filtered off, washed with methanol and is obtained as an almost-white product. From the combined filtrate and methanol washes, the insoluble, stable, yellow brucine salt of p-nitrobenzoyl D-threonine is recovered. Additional amounts of the brucine salts of the L- and D-isomers are secured after concentration of the mother liquors followed by cooling. L- and D-threonine are obtained from the brucine salts of their p-nitrobenzoyl derivatives by treating the salts with an alkali hydroxide, separating the brucine and removing the p-nitrobenzoyl group by refluxing with hydrobromic acid.

P-nitrobenzoyl-threonine is prepared by a method similar to that described by Fischer and Jacobs (Berichte 39, 2942, 1906) which involves reacting DL-threonine with p-nitrobenzoyl chloride in the presence of sodium hydroxide. The insoluble n-nitrobenzoic acid is also obtained and considerable care is exercised to effect a complete separation of these two compounds.

It is necessary to have a product free of p-nitrobenzoic acid for two reasons, namely, (1) its presents will interfere with the effective resolution of DL-threonine and, (2) it forms a colored salt with brucine that makes it difficult to detect contamination of the brucine salt of p-nitrobenzoyl-L-threonine with that of its optical isomer.

The following examples illustrate the methods of carrying out the present invention, but it is to be understood that these examples are given by way of illustration and not of limitation.

EXAMPLE I

Brucine salt of p-nitrobenzoyl-DL-threonine

To a warm solution (50–55°) of 64 g. (0.149 mole) of brucine alkaloid Merck ($C_{23}H_{26}O_4N_2.2H_2O$, M. W.—430.3) dissolved in 160 cc. of methanol was added 40 g. (0.149 mole) of p-nitrobenzoyl-DL-threonine. The 300 cc. Erlenmeyer flask was heated on a hot plate until solution was complete. Accompanied by rapid stirring and scratching, the solution was cooled in an ice bath, whereupon crystallization took place within a short time. The cooling and stirring were continued for a total of 5 minutes, during which time the temperature dropped to 25° and a heavy yellowish precipitate, consisting of a mixture of the brucine salts of p-nitrobenzoyl-L-threonine and n-nitrobenzoyl-D-threonine, was formed. The flask was reheated to 50°, the solution was stirred and then cooled to 25–30° over a 5–10 minute period. The brucine salt of p-nitrobenzoyl-L-threonine was filtered and the small amount of product adhering to the flask was transferred with the mother liquors. After washing the cake thoroughly in a mortar with 60 cc. of cold methanol, the slurry was transferred back to a separatory funnel and rewashed with approximately 60 cc. of methanol. As much of the wash liquors as possible were removed by suction. The product was then washed with two 50 cc. portions of ether, the washes being collected in a separate receiver. The dried L-threonine salt, almost white in color, weighed 46 g. (88% yield) and melted at 145–150°.

Two factors, time and temperature, are very critical in this method of resolution. In the process of separation, advantage is taken of the difference in solubility in methanol of the brucine salts of L- and D-p-nitrobenzoyl threonine. This difference in solubility decreases as the soluble orange form of the p-nitrobenzoyl-D-threonine salt changes over to the insoluble light yellow form. The change from the soluble to the insoluble state of p-nitrobenzoyl-D-threonine is affected by temperature and the length of time of standing and for this reason, these factors are extremely important and critical in this method of resolution. The limits of 5 minutes at a solution temperature of about 0° C. to 5 hours at a solution temperature of about 50° C. cannot be exceeded without unduly complicataing the separation and isolation of the L- and D-brucine salts. The volume of the solution should likewise be kept as low as possible so that the L-salt will precipitate rapidly and in good yield. The aforementioned L-salt may then be removed before a significant quantity of the soluble form of the D-salt has had an opportunity to be converted to the insoluble form.

Since some of the D-salt also separates out during the initial cooling, the precipitated product is reheated to about 55°, thereby dissolving the more soluble D-salt once again and leaving most of the more insoluble L-diastereoisomer as a precipitate. Upon cooling, only a very small amount of the D-form appears to crystallize again during the 5 minute period.

During filtration, the transfer and washing of the cake should be carried out rapidly. It is preferable to keep the cake a little moist with filtrate or methanol at all times, with the exception of the last wash when most of the solvent is removed by suction. By allowing the unwashed L-brucine salt to become dry, the orange colored D-form is precipitated as the thin film of solvent evaporates. In such instances, the addition of more solvent is required because of the difficulty in dissolving the impurity.

In the final ether washes, traces of the D-salt are removed together with the methanol remaining in the moist cake. This ether is not combined with the methanol solutions since its addition will cause an oil to be precipitated. The loss of product in the ether, however, is negligible.

The combined filtrate and methanol washes (volume about 260 cc.) were allowed to stand at room temperature overnight and then were cooled in an ice bath for two hours. The yellow brucine salt of p-nitrobenzoyl-D-threonine is filtered and dried without washing. The weight of salt=41 g. (78.5% yield); M. P. 190–192°.

By concentrating the mother liquors to a volume of 90 cc. in vacuo, followed by scratching to induce crystallization and cooling in an ice bath for 1 hour, an additional 2 g. of the brucine salt of the p-nitrobenzoyl-L-threonine (M. P. 147–150°) was obtained.

The combined total yield of the brucine salt of p-nitrobenzoyl-L-threonine was 48 g. or 92%.

The resulting mother liquors and washes were again concentrated to a volume of 25 cc. and then placed in a refrigerator for 2 hours. An orange mass separated out. After filtering, washing with a small amount of cold methanol and drying, 5 g. of the brucine salt of p-nitrobenzoyl-D-threonine were obtained.

The combined total yield of the brucine salt of p-nitrobenzoyl-D-threonine was 46 g. or 88.5%.

The brucine salts of both isomers were found by the Karl Fischer method to crystallize with 2 molecules of water. The empirical formula is $C_{34}H_{38}O_{10}N_4.2H_2O$ and the molecular weight is 698.7.

Depending upon the conditions under which the D-form is obtained, the crystals may vary in color from orange to yellow. The less stable orange form melts in a temperature range of 149–154° while the yellow form melts at 191–193°. In color, the p-nitrobenzoyl-L-threonine brucine salt is practically white and any yellow or orange color due to the D-form is easily removed by the methanol washes. However, when the p-nitrobenzoic acid is not completely extracted with ether from the p-nitrobenzoyl-DL-threonine derivative, the L-brucine compound comes down as a buff-colored salt due to contamination with the brucine salt of p-nitrobenzoic acid. Because of its greater insolubility in methanol, this impurity can not be readily removed by washing or recrystallization. Since the melting point of p-nitrobenzoyl-DL-threonine is not a satisfactory method for the determination of its purity, a preliminary resolution should be carried out on a small sample. No further extraction with ether is required if a white brucine salt is obtained.

It may be noted that although other solvents such as ethyl alcohol, isopropyl alcohol, ethyl acetate, etc. can be successfully used, methyl alcohol is preferred because better resolution and higher yields of isomers are obtained therewith.

EXAMPLE II

L-threonine

To a 1 liter Erlenmeyer flask containing 500 cc. of warm water (temperature 50°) was added 48 g. of the brucine salt of p-nitrobenzoyl-L-threonine and the flask placed in a water bath maintained at 40–50°. Eighty cc. of a normal sodium hydroxide solution were slowly added with vigorous stirring. The solution was stirred for an additional hour under the same conditions. After chilling in an ice bath for 30 minutes, the brucine was filtered and washed with two 100 cc. portions of ice water. The recovered and dried brucine weighed 26.5 g. Traces of brucine remaining in the mother liquors and washes were removed by extracting the combined solutions with 150 cc. of chloroform and 150 cc. of ether. About 1.2 g. of brucine was recovered from the chloroform extract upon evaporation of the solvent; the amount found in the ether extract was negligible.

The aqueous solution containing the sodium salt of p-nitrobenzoyl-L-threonine was concentrated in vacuo to a volume of 80 cc. and then refluxed for 4 hours with 56 cc. of hydrobromic acid. After storing the mixture in a refrigerator overnight, the p-nitrobenzoic acid was filtered, washed with two 50 cc. portions of cold water and dried. The theoretical amount of acid (11.7 g.) was recovered. The mother liquors, combined with the washings, were concentrated to a syrup in vacuo, redissolved in 50 cc. of water and again concentrated in vacuo. The resulting syrup was warmed on the steam bath with 50 cc. of absolute ethanol until all particles of the oil were dissolved and only the white insoluble sodium bromide remained out of solution. To insure a complete removal of water and hydrobromic acid, the solution was again concentrated and the resultant oil was dissolved in 100 cc. of absolute ethanol. The solution was then treated with 0.2 g. of Darco-G-60, filtered and the residue was washed with 40 cc. of cold absolute ethanol. To the filtrate and washings which had been warmed to 50°, 20 cc. of concentrated ammonium hydroxide was added causing the crude L-threonine to precipitate immediately. After chilling for 15 minutes in an ice bath, the product was filtered and washed with ethanol. The crude material (weighing 7.0 g.) contained only a trace of bromide ion. It was dissolved in 30 cc. of hot water and treated with 0.2 g. of Darco-G-60. After filtration, the charcoal cake was washed with 5 cc. of hot water. One hundred and forty cc. of absolute alcohol were added slowly with stirring to the warm filtrate (50–55°). The solution was allowed to stand at room temperature for 15 minutes and then placed in an ice bath for the same length of time. After filtering, washing with ethanol and drying, pure L-threonine was obtained in the form of brilliantly white leaflets. The yield was 6.25 g. representing an overall yield of 49.5% based on the amount of DL-threonine used. Based on p-nitrobenzoyl-DL-threonine, the yield was 70.5%.

Optical rotation: $[\alpha]^{D}26 = -27.9°$ (5% aqueous solution).

Literature value: $[\alpha]^{D}26 = -28.3°$ (1% aqueous solution).

EXAMPLE III

D-threonine

Using the same procedure as described above, an overall yield of 43.6% was obtained. A yield of 5.88 g. of the crude product was obtained from 46 g. of the brucine salt of p-nitrobenzoyl-D-threonine. The recrystallized material weighed 5.5 g. On the basis of p-nitrobenzoyl-DL-threonine, the yield of D-threonine was 62%.

Optical rotation: $[\alpha]^{D}26 = +27.8°$ (5% aqueous solution).

Solubility studies on samples of these products indicated a purity of $99.7 \pm 0.1\%$ for both isomers.

71% of the theoretical amount of p-nitrobenzoic acid and 88% of the brucine used were recovered in the process.

Various changes and modifications may be made in carrying out the present invention without departing from the spirit and scope thereof. Insofar as these changes and modifications are within the scope of the appended claims, they are to be considered as part of this invention.

We claim:

1. The process for resolving the p-nitrobenzoyl derivative of DL-threonine which comprises reacting said p-nitrobenzoyl derivative of DL-threonine with brucine in methanol, allowing the brucine salt of p-nitrobenzoyl-L-threonine to precipitate from solution while maintaining the soluble form of the brucine salt of p-nitrobenzoyl-D-threonine in solution by terminating said precipitation after a period ranging from about 5 minutes at 0° C. to about five hours at 50° C., and recovering the precipitated brucine salt of p-nitrobenzoyl-L-threonine in substantially pure form from the reaction mixture.

2. The process for resolving the p-nitrobenzoyl derivative of DL-threonine which comprises reacting said p-nitrobenzoyl derivative of DL-threonine with brucine in methanol, heating the resulting reaction mixture to about 50° C., cooling said mixture to about 25–30° C. for about 5 to 10 minutes, and recovering the precipitated brucine salt of p-nitrobenzoyl-L-threonine in substantially pure form from the resulting reaction mixture.

ARTHUR J. ZAMBITO.
EUGENE E. HOWE.

REFERENCES CITED

The following references are of record in the file of this patent:

Fischer et al.: Ber. Deut. Chem., vol. 39, pp. 2942–2950 (1906).

West et al.: J. Biol. Chem., vol. 119, pp. 109–119 (1937).

Maeda et al.: Chem. Abstracts, vol. 33, p. 2948 (1939).